J. W. THOMPSON.
MUZZLE.
APPLICATION FILED MAR. 1, 1913.
1,082,372.
Patented Dec. 23, 1913.
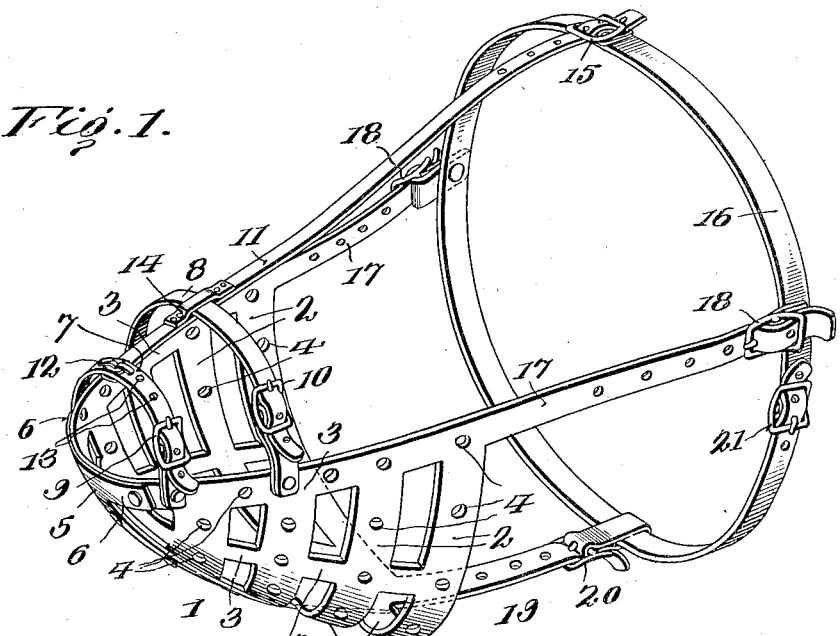
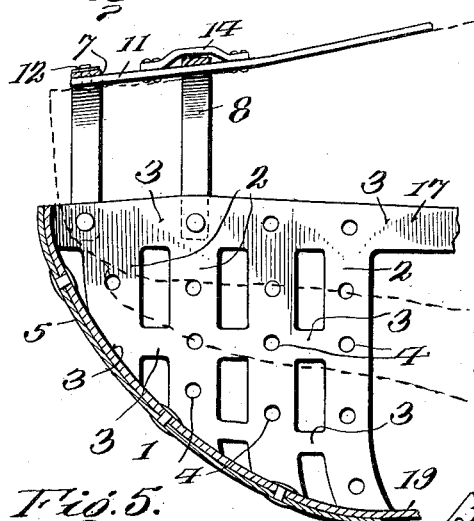
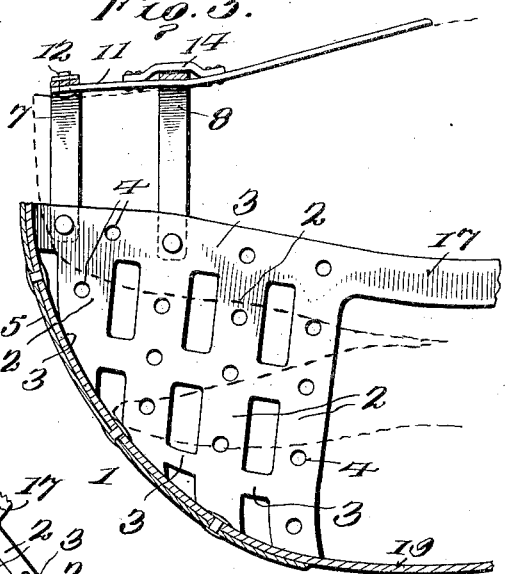
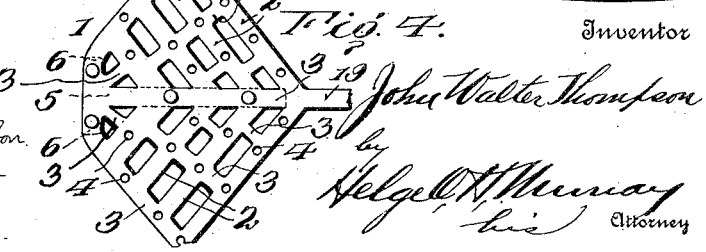

UNITED STATES PATENT OFFICE.

JOHN WALTER THOMPSON, OF WASHINGTON, DISTRICT OF COLUMBIA.

MUZZLE.

1,082,372.

Specification of Letters Patent.

Patented Dec. 23, 1913.

Application filed March 1, 1913. Serial No. 751,582.

*To all whom it may concern:*

Be it known that I, JOHN WALTER THOMPSON, a citizen of the United States, residing at Washington, in the District of Columbia, have invented certain new and useful Improvements in Muzzles, of which the following is a specification.

My invention relates to improvements in animal muzzles, and has relation more particularly to those for use upon animals which pant and sweat through the mouth, such as dogs and the like.

In practice I have found that the muzzles now in use do not permit of a free and humane movement of the mouth of the animal, and at the same time give absolute protection to the public from possible biting or tooth scratching. Also I have found that animals equipped with such forms of muzzles cannot open their mouths sufficiently far to sweat and pant without rendering the relative safety of the muzzle inefficient.

It is to overcome these present defects that I have designed the present invention and provided a muzzle in which a humane and efficient protector is combined, which is equally effectual as regards the animal injuring the public, and from any possible foreign or poisonous substances the animal itself may come in contact with.

To this end the object of my invention is the provision of a muzzle which will permit an animal to breathe, pant and sweat, by reason of a complete freedom of the lower jaw, and the extending of the tongue within the muzzle.

Another object is to provide a muzzle in which the tongue or any part of the mouth of the animal, while at liberty to move freely within the muzzle, cannot be brought into contact with any extraneous substances or objects.

With these and other objects in view, my invention consists in the further arrangements and combinations of parts hereafter described and claimed.

In the accompanying drawings Figure 1 is a perspective view of my improved muzzle as it would appear when in position upon a dog or other animal. Fig. 2 is a vertical sectional view through the muzzle proper illustrating the normal position of the animal's mouth in dotted lines within the muzzle. Fig. 3 is a similar view showing the muzzle in its rocked position by reason of the animal having opened his mouth, as shown in dotted lines. Fig. 4 is a plan view of the cover or cage part of the muzzle as it would appear before being curved to its proper contours, and Fig. 5 is a detail sectional view illustrating a form of fastening means for securing the upper longitudinal nose strap to the transverse forward nose strap.

The muzzle as illustrated is designed primarily for use upon dogs, but it is not expressly limited to animals of that family alone.

In constructing my improved device I provide a lower yielding part 1 which is made in the form of a cage or cover section suitably large to permit of free and easy movement of the animal's mouth therein. As shown in Fig. 4 of the drawings this cover section is preferably stamped from leather or other suitable tough yet soft material. Ribs 2 are formed, as a result of this construction, and connecting these ribs are the longitudinal ribs 3 all of which when stamped are diagonally arranged so that when curved to conform to the animal's mouth they will extend transversely and longitudinally of the cover, as shown. By this formation also, a light, yet substantial rigid structure is formed. The transverse ribs 2 and the longitudinal connecting ribs 3 thus formed, are provided with openings 4 so as to properly ventilate the cover section for the animal.

Between the lateral ribs 2 and the longitudinal ribs 3 openings are formed, which in no instance will be left large enough to allow an animal to extend its tongue through, or otherwise manage to push it through. The ribs are preferably stamped diagonally and close enough together, so that all tendencies on the part of the animal to bring his mouth or tongue into contact with any extraneous objects will be frustrated without any injurious results to the animal.

A metal guard 5 is secured to the central longitudinal rib 2 upon the outside of the muzzle. Two extensions 6—6 are formed upon the upper part thereof and serve to add greater rigidity and strength to the cover section throughout and prevent the animal from rooting and rubbing the material, while at the same time making it impossible to obtain a purchase should he try to pick up or eat any substance on the outside of the muzzle. The guard can be bent into the proper shape for curving the cover section about the animal's mouth with the correct amount of freedom. This has been found highly advantageous to owners of trained and other valuable animals, where it is necessary to protect the animal itself from injury through poisonous or other contagious substances.

Upon the forward part of the muzzle I provide two more straps 7 and 8. These are secured at one side upon the upper longitudinal rib 2, while upon the opposite side thereof, buckles 9 and 10 are secured to fasten the same. The nose straps are provided at their ends with adjusting holes whereby the cover section can be properly placed upon the dog and then securely fastened.

An upper longitudinal nose strap 11 is fastened to the forward nose strap 7 by means of a split fastener and washer 12. Holes 13 are provided centrally of the nose strap 7 whereby in assembling the device, the upper longitudinal nose strap 11 will be centrally adjusted for different size animals. A loop 14 is secured to the upper strap 11 and allows the nose strap 8 to freely slide through it. By this forward means of securing the cover section it will be seen that any adjustments can be secured so as to properly put the nose of the animal into the muzzle. The upper nose strap 11 extends rearwardly and is adjustably secured to a buckle 15 carried by the throat or neck strap 16. Extending also rearwardly are the two side straps 17 which are in the present instance continuations of the upper longitudinal ribs 3. Suitable buckles 18 are carried by the throat or neck strap to which the side straps 17 adjustably fasten. A strap 19 which is a continuation of the lower longitudinal rib 3 extends rearwardly and is adjustably fastened to a buckle 20 carried by the neck strap 17. The usual buckle 21 for securing the neck strap in place is provided whereby the muzzle can be quickly removed, after properly adjusting it to the particular size animal.

In putting the muzzle upon an animal, the forward nose straps are adjusted so that the upper edge of the cover section is brought above the animal's mouth and directly beneath his nostrils. This prevents the animal from extending his tongue without the cover section, and at the same time does not interfere in any way with his breathing. The upper nose strap, side straps and lower or chin strap are then adjusted and the neck strap buckled in place behind the animal's ears.

The operation of the animal's mouth within the muzzle is effected by the animal opening his mouth far enough to allow the lower jaw to partially force the cover section out of its normal position, by reason of the lower jaw contacting with the inner side of the central longitudinal rib 3. The cover section is partially rocked from the rear, the nose straps 7 and 8 preventing it from being lowered at its forward end. In this manner any tendency of the animal to extend the tongue is arrested. The nozzle is constructed sufficiently large to prevent an animal from opening his jaw wide enough to pass the rear of the cover section. Should the cover section need adjustment with regard to the space within the same and the freedom necessary for complete comfort to the animal, the metal guard may be bent to the proper shape to compensate for this easy action.

From the foregoing it will be obvious that a practical and humane device is designed, in which all of the comforts of the animal are provided for; and all possible injuries to the public are prevented.

The reciprocal effect of the substantially closed cover section, whereby injury to the animal may result, as hereinbefore described, is also apparent.

Having thus described my invention, what I claim is:—

A muzzle comprising a continuous flexible cover section, shaped to conform and spaced from the animal's lower jaw and having small openings therein of such size that the animal is prevented from extending his tongue therethrough, the upper edge of said cover section terminating short of the animal's nostrils and above the mouth, the bottom being beneath the lower jaw when the mouth is open, devices attached to the cover section and extending over the nostrils, and devices for securing said cover section in position upon the animal's head.

In testimony whereof I affix my signature in presence of two witnesses.

JOHN WALTER THOMPSON.

Witnesses:
 ERNEST G. THOMPSON,
 JAMES F. FITZ GIBBON.

---

Copies of this patent may be obtained for five cents each, by addressing the "Commissioner of Patents, Washington, D. C."